United States Patent
Wilson et al.

(10) Patent No.: US 8,078,663 B2
(45) Date of Patent: Dec. 13, 2011

(54) OPTICAL CORRELATION APPARATUS AND METHOD

(75) Inventors: Rebecca A Wilson, Malvern (GB); Meirion F Lewis, Malvern (GB); Andrew C Lewin, Malvern (GB)

(73) Assignee: QinetiQ Limited, London (GB)

( * ) Notice: Subject to any disclaimer, the term of this patent is extended or adjusted under 35 U.S.C. 154(b) by 1258 days.

(21) Appl. No.: 11/664,348

(22) PCT Filed: Oct. 18, 2005

(86) PCT No.: PCT/GB2005/004028

§ 371 (c)(1),
(2), (4) Date: Apr. 2, 2007

(87) PCT Pub. No.: WO2006/043057

PCT Pub. Date: Apr. 27, 2006

(65) Prior Publication Data

US 2008/0021948 A1   Jan. 24, 2008

(30) Foreign Application Priority Data

Oct. 18, 2004   (GB) .................................. 0423093.4

(51) Int. Cl.
*G06E 3/00*   (2006.01)
(52) U.S. Cl. ....................................................... 708/816
(58) Field of Classification Search ................... 708/816
See application file for complete search history.

(56) References Cited

U.S. PATENT DOCUMENTS

| 3,441,724 A | 4/1969 | Taylor, Jr. |
| 4,651,297 A | 3/1987 | Schlunt |
| 5,040,140 A | 8/1991 | Horner |
| 5,276,636 A | 1/1994 | Cohn |

FOREIGN PATENT DOCUMENTS

| EP | 0 587 020 | 3/1994 |
| GB | 2 317 487 | 3/1998 |
| GB | 2 363 886 | 1/2002 |
| JP | 2001-166261 | 6/2001 |

OTHER PUBLICATIONS

International Search Report for PCT/GB05/04028 mailed Jul. 6, 2006.
UK Search Report for GB 0423093.4, date of search: Feb. 25, 2005.
Calabretta et al., *All-optical header processor for packet switched networks*, IEE Proceedings: Optoelectronics, vol. 150, No. 3, Jun. 17, 2003, pp. 219-223, XP006020440.
J. Nishikido et al, "Optical Routing Control Using Coherent Pattern-Matching Circuit for Photonic Self-Routing Switch" INFOCOM '92, 1992, pp. 0459-0467.
Translation of Japanese Notice of Rejection mailed Sep. 21, 2010 in JP 2007-536268.

*Primary Examiner* — Tan V Mai
(74) *Attorney, Agent, or Firm* — Nixon & Vanderhye P.C.

(57) ABSTRACT

This invention relates to a pattern recognition correlator and method for correlating input data with one or more reference data sets. The input data, which may be for instance digital amplitude modulated optical data, is used to modulate an optical signal to form a phase modulated optical signal. This temporal phase modulated optical signal is then converted into a parallel optical phase signal, preferably through use of an optical delay, and modulated by an optical phase modulator. When there is a correlation between the input data and the reference data the emerging wavefront is plane and can be strongly coupled to a detector. In the absence of correlation the emergent wavefront is not plane and so is not coupled as strongly to the detector. The detector output can therefore be used as an indication of correlation.

34 Claims, 4 Drawing Sheets

OPTICAL CORRELATION APPARATUS AND METHOD

Figure 1:
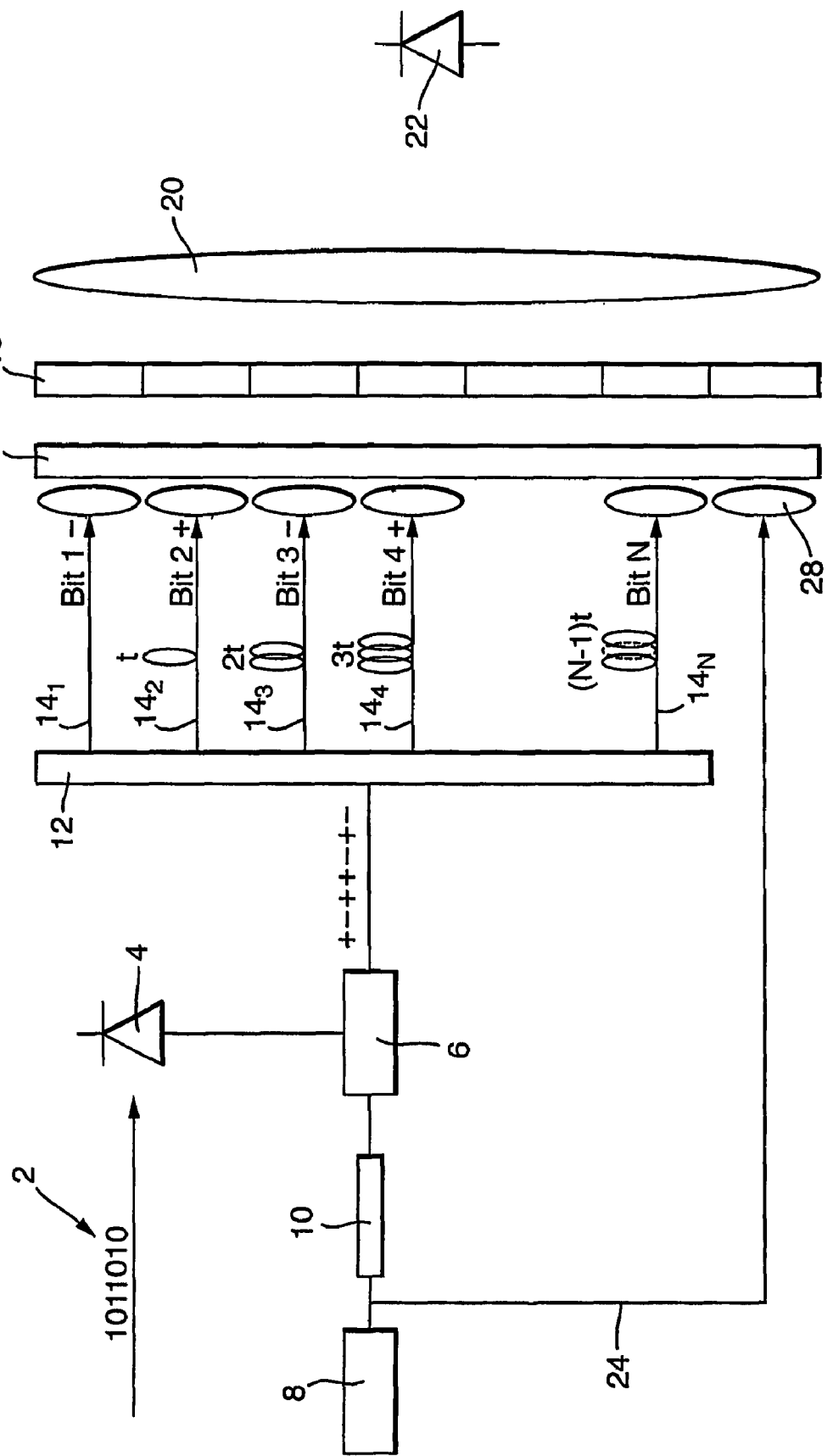

This application is the U.S. national phase of international application PCT/GB2005/004028 filed 18 Oct. 2005, which designated the U.S. and claims benefit of GB 0423093.4 filed 18 Oct. 2004, the entire contents of each of which are hereby incorporated by reference.

This invention relates to an apparatus and method for pattern recognition, i.e. the correlation of search data with reference data, especially to an optical apparatus for converting a temporal data stream into a parallel data pattern for the purpose of performing correlation.

Pattern recognition is concerned with the process of recognising one or more known objects in incoming data, for example text or imagery, by comparing known reference object(s) with the data. An ideal way to perform pattern recognition autonomously is through the mathematical operation of correlation. This patent is concerned with an improved correlator employing optical techniques for very high speed operation.

There are many areas in which pattern recognition is used, from interrogating databases to locate specific search terms to biometric based recognition systems and target identification in two-dimensional imagery. Often the search is performed digitally using a suitably programmed processor to compare a known reference data string with the data to be searched to identify a match. One example is an internet search engine which compares one or more input reference words with internet data to identify a match.

When searching very large amounts of data however software based pattern identification techniques may be slow or require very large processing power. Also when data is received at high data rates, for example at telecommunications data transfer rates, software based systems may be unable to perform correlation at this speed.

Optical pattern recognition systems known as matched filters or correlators are also known and can be used to match spatial patterns. One of the earliest such schemes is the Vander Lugt optical matched filter described in A Vander Lugt, "Signal detection by complex spatial filtering", IEEE Trans. Inf. Theory IT-10, p 139-145 (1964). This system uses an optical arrangement to multiply the Fourier Transform of a scene with the conjugate Fourier Transform of a reference pattern before performing an inverse Fourier Transform on the combined pattern. If a strong correlation exists between the reference and the image a sharp bright peak is produced in the back focal plane of the system. Thus this system compares an observed image with a reference image and indicates if there is a correlation, and, if so, where it occurs—that is the system identifies the presence and location(s) of a target in a scene. More recent optical pattern recognition systems perform the Fourier Transforms (FTs) of the scene and reference pattern electronically and display the combined FTs on a spatial light modulator (SLM) thereby simplifying and speeding up the operation, see for example the correlator described in International Patent Application WO 00/17809. Such optical pattern recognition systems can work well for target identification in an observed scene etc. but for searching data repositories they require updating of an SLM with either the data to be searched or the combined data and reference pattern. Even with fast SLMs the update speed of the SLM limits the speed of correlation for the latter application. Note—as used herein the term correlator will be taken to include matched filters based systems.

It is therefore an object of this invention to provide a system capable of high speed pattern recognition and able to cope with very high input data rates.

Thus according to the present invention there is provided a correlation apparatus comprising an optical delay means for converting a temporal input data stream to at least one parallel optical data stream having a phase modulation replicating the input data and a reference phase modulator for applying a parallel phase modulation replicating at least one reference data set wherein the reference phase modulator and optical delay means are aligned so as to create a parallel optical signal which has been modulated in phase according to both input and reference data.

The present invention uses optical phase to provide a means of performing correlation. The input data stream is used to generate a parallel optical signal having a phase modulation which replicates the input data, most usually by modulating a laser beam. The reference phase modulator provides a phase modulation based on a reference data set and the resultant parallel optical data signal is modulated by in phase by both the reference and input data. Thus an optical wavefront is produced which has a spatial phase pattern which is a combination of the two phase modulations. Where the two phase modulations are not matched the resulting phase of the wavefront will be random depending on the input data stream. However where there is a correlation between the reference data and the input data the combined phase modulations co-operate to produce an output wavefront with a known phase profile. Generally the system is arranged so that the phase of the wavefront is uniform, i.e. the wavefront is plane when there is a correlation between reference and data. This plane wavefront can be detected as will be described later and used as an indication of correlation between the input data and the reference data.

The optical delay means is arranged so as to convert an input temporal data stream into a parallel optical data stream. This parallel optical data stream is effectively a spatial phase pattern. The modulation applied by the reference phase modulator is a parallel phase modulation and so is also, in effect, a spatial phase pattern. Therefore the present invention can be thought of as operating by performing correlation on two spatial phase patterns, one formed from the input data and the other from the reference data. This enables the stream of input data, for instance digital data output from a database, to be input to the apparatus and correlation performed on the basis of simple spatial correlation techniques. It should be noted that the present invention can operate on a continuous input data stream.

The optical delay means preferably provides a plurality of channels each producing a replica of an input phase modulated optical signal and each having a different delay wherein the applied delay in successively delayed channels varies by a constant amount. In other words the optical delay means takes an input phase modulated optical signal and produces several replicas thereof each delayed with respect to the others by an increased, constant amount. Therefore the output of the optical delay means from the channel with the shortest delay will be the phase of the input optical signal at a particular time. The output from the channel with the next shortest delay, which corresponds to an increased delay of a time t, will be the phase of the optical input signal at a time t earlier. The output from the channels with the next two shortest delays will be the phase of the input signal at times 2t, and 3t earlier respectively and so on. Therefore the output from the optical delay means will be a series of snapshots of the input phase modulated optical signal as it evolves over time. In effect the temporal phase modulated input signal is changed into a parallel optical phase signal, wherein, at any one time, the output of each optical channel represents a different part of the input data. In effect the outputs of the optical delay means produces a spatial phase pattern, the exact arrangement of which depends on the physical arrangement of the channels of the optical delay means. In the simplest case the delayed signals are arrayed linearly in space, i.e. on a straight line as described later with respect to FIG. 1, although other configurations may be preferable.

As used herein the term parallel optical signal shall therefore be taken to mean an optical signal which has been separated into a number of distinct optical channels but shall also include a wavefront wherein the data is represented by the spatial phase profile.

Preferably the input phase modulated optical signal is a digital phase modulated signal and the incremental delay between successive delays is equal to the bit rate of the phase modulated optical signal, which normally is also the bit rate of the input data. In other words the duration of a bit in the input optical signal is the same as the amount by which successive channels are increasingly delayed. This ensures that each bit in the digital signal is represented by a different output channel of the optical delay means and that each output channel represents a different bit of the input phase modulated optical signal. The input optical signal will generally have a binary phase modulation, i.e. the phase is modulated to one of two phase states which are 180° out of phase.

This embodiment of the present invention, using optical delays to generate a spatial phase pattern from an input phase modulated temporal pattern, avoids the need to rapidly update a phase pattern on a spatial light modulator, such as may be used in known optical correlation systems. The input optical data is automatically replicated as parallel optical signal (in effect a spatial pattern) by the optical delay means which can be chosen to reflect arbitrarily high input data rates. The system therefore offers correlation speeds which are much greater than existing optical based correlation systems or all electronic data processing. As will be described with respect to a preferred embodiment the only high speed components required are a phase modulator and photodetectors, and high speed photodetectors and phase modulators are known in the telecommunications industry. Indeed as the speed of these components are key to how fast data can be transmitted in the telecommunications industry, the present invention inherently offers a system that can correlate data as fast as the data can be supplied to the correlator.

The system can also perform parallel correlations for several different reference patterns. As will be described more fully below the optical delay means preferably comprises an optical replicator for producing a plurality of optical data signals based on the input data. Each parallel data optical signal is modulated by a reference phase modulator replicating a different reference data set and the apparatus has means of independently detecting a correlation between a parallel optical data signal and any reference data phase modulation. The ability to cope with very high input data speeds and perform parallel correlation for a number of reference data sets is another advantage of the present invention.

The optical delay means could be any suitable optical arrangement for generating a plurality of successively delayed replicas of the input phase modulated optical signal. For instance beam splitting means could be used with a plurality of optical waveguide delay lines of different delays. This could readily be achieved by using optical fibres having common properties but differing lengths. The optical fibre employed should be single mode for fidelity, and preferably polarisation-maintaining for correct interference at the correlator output, eg focussing, as will be understood by those skilled in the art. As the outputs of single-mode fibre are essentially optical point sources, they will preferably be collimated prior to encountering the spatial optical phase modulator containing the reference phase pattern(s). A preferred means of collimation is the use of a lenslet array.

Integrated optics could alternatively be used to provide the plurality of optical waveguides of different length. Integrated optics can offer advantages in terms of greater temperature stability and on-chip phase modulation as compared with optical fibres. As will be understood by one skilled in the art, integrated optics comprise optical waveguides, possibly integrated with other electro-optic components in a substrate. The substrate may be a semiconductor material, such as silicon, or the waveguides may be embossed into a plastic. Free space optical delays, e.g. bulk optics or hollow core waveguides, could be used. The skilled person would be aware of a variety of ways of producing several replicas of an input optical signal increasingly delayed with respect to one another. For instance a multi-mode interference 1–N way splitter could be used to divide an input phase modulated optical signal into N different waveguides. Each waveguide could then be of a different length to provide a different delay in a manner similar to that described above with respect t optical fibres.

In most cases the input data received by the system is in high speed digital amplitude modulated form via an optical communication link or in electronic form, either digital or analogue, from an electronic database or from a data capture device. The optical delay means then preferably comprises a phase modulated optical source modulated in response to an input temporal data stream. Were the input data stream to comprise a phase modulated digital optical data stream it may be possible to direct the input data directly to the optical delay means provided that the data has the correct data rate and is stable in phase and frequency.

The input data stream is therefore used to phase modulate an optical source to produce the phase modulated optical signal input to the optical delay means. As mentioned above preferably the phase modulation is binary phase modulation, in other words the optical signal is modulated to one of two phase states which have a 180° phase difference.

The optical source conveniently comprises a laser. The laser should have a stable output both in terms of phase, as phase fluctuations of the laser may give rise to errors in correlation, and in terms of absolute frequency. As has been described the system relies on the use of optical phase and a change in the output frequency, and hence wavelength, of the laser will result in a phase change at the outputs of the optical delay means. The skilled person would be aware of suitable laser sources for instance a diode pumped YAG laser. It should be noted that laser sources currently used in the telecommunications industry would not normally be stable enough. The laser may employ a stabilisation means to produce a stable output. International patent application WO 00/17613 describes a laser stabilisation apparatus that may be used as the stable laser for the present invention. The output of the stable laser is conveniently modulated by a phase modulator. The phase modulator should be capable of binary phase modulation and should, for a digital input data stream, be able to operate at the data rate of the input data. Again, Mach-Zehnder amplitude modulators used within the telecommunications industry contain phase modulators of exactly the type required here, and some such individual phase modulators are available commercially.

As mentioned the input data may be received in a variety of forms. When the input data comprises digital electrical signals these could be fed directly to the phase modulator to modulate the laser output. When the input data stream is a digital optical data stream, such as may be received via a high speed fibre optic data link, it will be necessary to convert the input data stream from an amplitude modulated signal. Therefore in such an embodiment the correlation apparatus may comprise a photodetector to convert the optical signal to an electrical signal to phase modulate the stable optical source.

In one embodiment of the invention the reference phase modulator comprises a spatial optical phase modulator displaying a spatial phase modulation pattern based on the reference data set. The output of the optical delay means is then arranged in optical alignment with the spatial optical phase modulator displaying the reference phase pattern. The output of the optical delay means, which may preferably be collimated, has a spatially varying phase depending upon the input data. This wavefront is then modulated by the reference phase pattern on the spatial optical phase modulator. Where there is no correlation between the reference pattern and the data spatial phase pattern the resulting phase will vary in a random fashion depending on the input data, i.e. the wavefront will be non planar. However where the reference phase pattern is the conjugate of the data phase pattern the emerging optical wavefront will be a plane wavefront.

In another embodiment of the invention, particularly applicable when the optical delay means is implemented in integrated optics, the reference phase modulator may comprise a plurality of phase modulating elements, at least one phase modulating element for each optical channel. The phase modulating elements may be electro-optic modulators and when used with integrated optics may be on-chip electro-optic phase modulators.

Therefore each channel has its own individual phase modulator element to apply a phase modulation to that channel, the modulation applied to all the channels of the optical delay means representing the reference data. Note that the reference phase modulation does not necessarily have to be applied at the output of the optical channel. Each channel should be modulated appropriately by a phase modulator element but this could be at the input, output or anywhere along the optical path. Furthermore each optical channel could have its reference phase modulator element located at a different point. Use of integrated optics to provide separate optical channels, each having its own phase modulator eliminates the need for precise alignment with any SLM and provides a correlation apparatus on a chip.

To detect a plane wavefront, and hence a correlation, the correlation apparatus preferably further comprises a combining means for causing interferometric coupling of the parallel optical signal at a photodetector for detecting the output of the combining means. As mentioned above the apparatus is generally arranged such that where there is a correlation between the input data and the reference data the combined effect of the phase modulations is to produce a wavefront which is all in phase. Where there is no correlation the resulting wavefront will have spatial phase variations. The combining means causes interference of the wavefront with itself. Where the wavefront is all in phase it will constructively interfere to give a high intensity signal at the detector. Where however the wavefront has a varying spatial phase it will partly destructively interfere and the intensity at the photodetector will be much less. Thus the intensity of light detected by the photodetector can be used as an indication of correlation.

The combining means may simply comprise a focussing element in optical alignment with the parallel optical data signal and the photodetector may be a point photodetector located at the focal point of the or each focussing element. The focussing element will focus the modulated wavefront to the focal point—however as mentioned the degree of focussing will depend on the planarity, i.e. the phase, of the modulated wavefront. A plane wavefront will, ideally, be perfectly focussed to the focal point of the focussing element whereas a wavefront with a random phase distribution will be unfocussed at the focal point. In the event of correlation the emergent wavefront is plane and therefore strongly focussed on to a "point" detector located at the focus of the focussing element. However if the wavefront was not plane, and hence the radiation is not all focussed at the focal point some radiation will not fall on the photodetector.

Alternatively the combining means could comprise an integrated optics combiner, for instance a multi-mode interference combiner. As will be understood by one skilled in the art, multi-mode interference (MMI) devices are well know devices which use multiple mode waveguides to exploit the re-imaging technique to perform beam combination and or splitting. In this instance the plurality of optical channels would be arranged with there outputs regularly spaced as inputs to a MMI combiner which would have a single output at the reimaging point. Each optical channel will excite multiple modes within the MMI device which will constructively or destructively interfere depending on the relative phases to provide a single output. The photodetector would then be located at the end of the output waveguide and again the intensity of light received would be indicative of the degree of correlation.

As mentioned the intensity of radiation received at the photodetector is indicative of the planarity, i.e. phase coherence, of the wavefront and hence the degree of correlation between the input and reference data. The output of the detector may therefore be monitored and, for example, an intensity relative to a certain predetermined level used as an indication of correlation. This predetermined level is preferably set and stored by calibrating the system by injecting data signals with the required reference data sequences. The calibration process may be repeated at intervals to correct for small drifts in performance, e.g. through changes in temperature over time.

The apparatus may therefore comprise a calibration means for inputting data known to correlate with reference data and measuring the output of the apparatus. Preferably the calibration means monitors the output of the photodetector when the known data is input and sets a threshold for identifying a correlation based on this output, i.e. intensity level. The calibration means may also adjust the reference phase modulation applied in response to phase drift of the apparatus. Where a phase modulating SLM is used to provide the reference phase modulation this could be by changing at least part of the reference phase pattern displayed. Where individual phase modulators are used with each channel the modulation applied to any channel can be adjusted as necessary.

As used herein the term point photodetector is taken to mean a photodetector having a relatively small detection area or pixel area, such as around say $10\,\mu m^2$. It will be appreciated that the photodetector should be small enough so that the intensity of strongly focussed light differs markedly from that which is not strongly focussed but should provide a useful detection area. Detectors with characteristics similar to New Focus detector 1577-A, having a bandwidth of 12 GHz and a detection area of 25 $\mu m^2$, or a New Focus 1011 which has a bandwidth of 45 GHz and a detector area of 12 $\mu m^2$ may be suitable.

The output detector bandwidth should not be less than the data rate. If it is close to the data rate the detector will integrate over a data bit period which is a convenient operating condition.

Suitable focussing means may be a refractive lens arrangement or alternatively or additionally could comprise one or more diffractive optical elements. Where the focussing element is a diffractive element it could, in some circumstances, be incorporated into the pattern displayed on the reference spatial optical phase modulator, e.g. by the addition of a quadratic phase function. Conveniently though the overall geometry is arranged such that the focussing element comprises a single refractive lens, either on its own or as part of an array, of an appropriate design to focus a wavefront modified by the reference spatial phase pattern.

When the reference phase modulation is applied by using a spatial optical phase modulator this modulator may be anything capable of modulating the phase of light in the desired way. Conveniently to allow updating with different reference phase patterns the spatial optical phase modulator comprises a phase modulating spatial light modulator (SLM). Phase modulating SLMs are well known in the art and as mentioned above have been used in optical correlators previously. In the present invention however the reference SLM need only be updated infrequently and hence the update rate does not limit the speed of operation. For instance where the apparatus is interrogating a large database the search terms will be used to generate a reference data spatial phase pattern which is written to the reference SLM. The data from the database can then be read out at a very high data rate.

Note however that when the reference pattern is fixed, i.e. it does not need updating, the spatial optical phase modulator could be a fixed pattern, for, instance an etched glass slide or the like displaying the fixed phase pattern.

The spatial optical phase modulator may operate in transmissive or reflective mode as will be understood by one skilled in the art as long as the pattern displayed thereon is in optical alignment with the generated data spatial phase pattern.

In most embodiments there may be more than one reference data set which it is wished to compare with the input data stream for correlation. For instance there may be several search terms that it is wished to search a database for. In which case preferably the optical delay means generates a plurality of identical data parallel optical signals, each data parallel optical signal being modulated separately by a different reference phase modulation corresponding to a different reference data set.

Where the reference phase modulation is performed by displaying a reference phase pattern on a spatial optical phase modulator each reference spatial phase pattern may be displayed on a separate spatial optical phase modulator or a single spatial optical phase modulator, such as a phase modulating SLM, may display the plurality of reference patterns. Preferably the plurality of reference phase patterns are displayed on an SLM. Writing the reference patterns to the SLM may be achieved in a number of different ways. For instance in an application for interrogating a large database the search terms may be input and converted to reference phase patterns displayed on the SLM prior to reading out the data from the database. After the search has been completed new reference patterns could be written to the SLM for a new search.

In some applications however it may be wished to amend search terms during a continuous data input flow. For instance it may be wished to search a continual input flow of say stock market data to identify trades of particular shares and it may be wished to update the list of transactions to be modified. In such cases it may not be feasible to pause the data flow and one may not want to stop performing correlations against the existing reference patterns. Therefore preferably the SLM is arranged to be illuminated with a plurality of input spatial phase data patterns whether or not there is a corresponding reference pattern displayed. As search terms are added the corresponding reference pattern can be written to a blank part of the SLM and as soon as the new reference pattern is completed the system can start identifying correlations for that pattern. This does not pause the input data flow and does not interrupt the correlations for existing patterns. It may be advantageous to manage the writing of reference patterns to the SLM so that there is generally a blank area on the SLM where a new reference pattern can be written. This allows the reference patterns to be updated by writing a new reference pattern to the blank area and then deleting a reference pattern no longer required from another part of the SLM—thus re-creating a blank area.

Where the correlation apparatus comprises an optical delay means having a plurality of different optical channels each having a different delay the device preferably includes an optical replication arrangement arranged to act on the output of the channels. In other words the optical delay arrangement converts the temporal input phase modulated data into a spatial data phase pattern which is then replicated by an optical replication arrangement. This arrangement uses a single optical delay means and then replicates the output thereof rather than requiring an optical delay means which separately applies the same delays to the corresponding channel for each data phase pattern.

A convenient optical replication arrangement is a diffractive optical arrangement such as a Dammann grating although other suitable means and combinations of means for generating multiple replicas of the output channels could be used. For example such means include further fibre optic splitting, and/or delay, multiple mirrors, and multiple reflections. In some circumstances it may be of benefit to present some of the replicated data across the SLM at differently delayed times.

The spatial arrangement of the reference pattern and data pattern can be chosen according to particular application and the components of the apparatus. For instance if the reference pattern is a representation of an n-bit digital string the reference pattern could be arranged as a linear array of different phase areas. In which case the generated data pattern is also arranged as a linear array of n different phase areas the two patterns being in optical alignment. When used with a lens the lens is also designed appropriately to focus the wavefront from the linear array to a point. In some such circumstances the preferred lens arrangement may illuminate the detector best by focussing the light in the long dimension and imaging it in the narrow dimension. However instead of a linear array the n bits of reference pattern could be arranged in any chosen pattern, e.g. a 40 bit pattern could be arranged as an 8×5 rectangular array of phase areas. In this case the lens might comprise a single spherical lens whose aperture is rectangular and covers the 8×5 array area. In the case of multiple references, an array of such lenslets may be used. Suitable array shapes include linear, square, rectangular, and hexagonal.

As mentioned previously the optical replication of the data spatial phase pattern offers parallel processing for several different search terms. Optical replication means that a plurality of input data patterns are produced simultaneously. As also mentioned above the reference patterns on the SLM do not need rapid updating. Therefore the ability to offer parallel correlation for several reference patterns at very high data rates is another key advantage of the present invention as all electronic digital processing would require huge amounts of processing power to perform parallel searches. Thus the present invention can be seen as a correlation apparatus comprising a reference spatial optical phase modulator for displaying a plurality of different reference spatial phase patterns in optical alignment with an optical replication means for generating a plurality of identical data spatial phase patterns wherein each data spatial phase pattern replicates a temporal input data stream.

Where the reference phase modulation is applied by a plurality of phase modulator elements acting on different optical channels of the optical delay means the apparatus may be arranged so that the optical delay means has a first set of optical channels having incremental delays, a second set of optical channels having the same incremental delays and so on. The phase modulator elements operating on the first set of optical channels apply a modulation representing a first reference data set and the phase modulator elements operating on the second set of optical channels apply a modulation representing a second reference data set and so on.

As mentioned previously the use of integrated optics provides a particularly useful embodiment of the invention which is robust and compact and compatible with telecoms data rates. Therefore in another aspect of the invention is provided a correlation apparatus comprising an input for receiving an optical phase modulated temporal data stream, a beam divider for dividing the optical phase modulated temporal data stream into at least a first set of waveguides, each waveguide in the set having a different optical length so as provide a different, incremental optical delay, and a beam combiner for interferometric coupling of the outputs of each set of waveguides to a detector wherein each waveguide has an associated electro-optic phase modulation for applying a phase modulation based on a reference data set. The beam divider and/or beam combiner may conveniently comprise MMI devices and the waveguides may be hollow core waveguides.

In an alternative embodiment of the invention the optical delay means comprises an acousto-optic cell. An acousto-optic cell comprises a medium, the refractive index of which may be changed by acoustic excitation of the medium. Therefore an acoustic wave may be transmitted through the cell to modify the optical properties thereof. Because of the relatively low speed of propagation of the acoustic wave in the acoustic medium an acoustic waveform may be applied to the cell and will propagate therethrough with a delay relative to the speed of light. The acoustic waveform forms a spatial replica of the temporal data waveform applied to the transducer. Thus a spatial pattern will be written to the acoustic cell over time. Preferably the acoustic cell comprises an acoustic medium, a transducer for transmitting an acoustic wave through the acoustic medium based on an input data stream and an absorber and/or other means of dissipating the acoustic wave on the far side of the acoustic medium. The transducer therefore writes the input data stream to the acoustic cell which propagates through the medium to eventually be absorbed.

Light incident on the acousto-optic cell is therefore phase modulated and one output component, known in the art as the "Bragg diffracted beam", acquires the spatial data phase pattern. The spatial optical phase modulator displaying the reference phase pattern is arranged in optical alignment with this output of the acousto-optic cell. Light, preferably emitted from a stable laser, is therefore modulated by both the reference and data phase patterns. As is described with reference to the embodiment above when there is a correlation between the reference and data patterns the emergent wavefront may be plane and can be detected by use of a lens arrangement with a point photodetector.

The acousto-optic cell offers a simple way of converting the temporal input data into a spatial data phase pattern. However the acousto-optic cell is limited in the speed at which it can operate to input data rates of 1 Gb/s or less by various factors including the limited bandwidth of the transducer and acoustic propagation loss at high frequencies, and therefore this embodiment is not preferred for use with a very high input data rates. The processing rate can, however, be increased in a more complex arrangement employing multi-channel acoustic "Bragg" cells. Similarly, an alternative configuration exists in which the order of the acoustic Bragg cell and reference phase modulator are transposed.

In another aspect of the invention there is provided a method of correlating input data with reference data comprising the steps of; taking a temporal phase modulated optical signal wherein the phase modulation represents the input data, converting the temporal phase modulated optical signal into at least one parallel data optical signal having a phase modulation which represents the input data, modulating said at least one parallel data optical signal with a phase modulation representing the reference data, interferometrically coupling the or each optical data signal modified by a reference modulation and directing onto a detector, and using the detector output as an indication of correlation between the input data and the reference data.

The method has all of the advantages described above with reference to the first aspect of the invention and offers a correlation process which is suitable for correlating data with very high input data rates.

Preferably the step of converting the temporal phase modulated optical signal into at least one parallel data optical signal comprises the step of inputting the temporal phase modulated optical signal into an optical delay means having a plurality of channels each producing a replica of the input phase modulated optical signal and each having a different delay wherein the applied delay in successively delayed channels varies by a constant amount and forming the optical data signal from the output channels. Conveniently the temporal phase modulated optical signal is a binary digital phase signal having a bit rate equal to the amount by which the delay in successive channels of the optical delay means varies.

The method may also comprise an initial calibration step of performing a correlation with input data known to correlate with the reference data and measuring the output of the associated detector and using the output to set a threshold level and may periodically repeat the calibration step. Conveniently the output of the detector during the calibration step is used to maintain the current threshold level, adjust the threshold level or indicate a need to re-set the phase states of the system.

When the optical phase modulator comprises an analogue spatial light modulator (SLM) the method may periodically adjust the phase of at least part of the appropriate reference spatial phase pattern displayed on the SLM to compensate for a phase drift in the radiation incident on the SLM at that point.

The present invention effectively converts input temporal data into a spatial phase pattern and also produces a reference phase pattern. The reference phase modulation can be thought of as a pattern whether displayed as a phase modulation pattern on an SLM or whether the consequence of several independent phase modulators acting on separate optical waveguides. A final combined phase pattern is produced from both of these patterns which is indicative of whether there is a correlation between the input data and the reference. Thus is another aspect of the invention there is provided a correlation apparatus comprising a spatial optical phase modulator for generating at least one reference spatial phase pattern in optical alignment with a means for generating at least one data spatial phase pattern wherein the data spatial phase pattern replicates a temporal input data stream.

Figure 2:
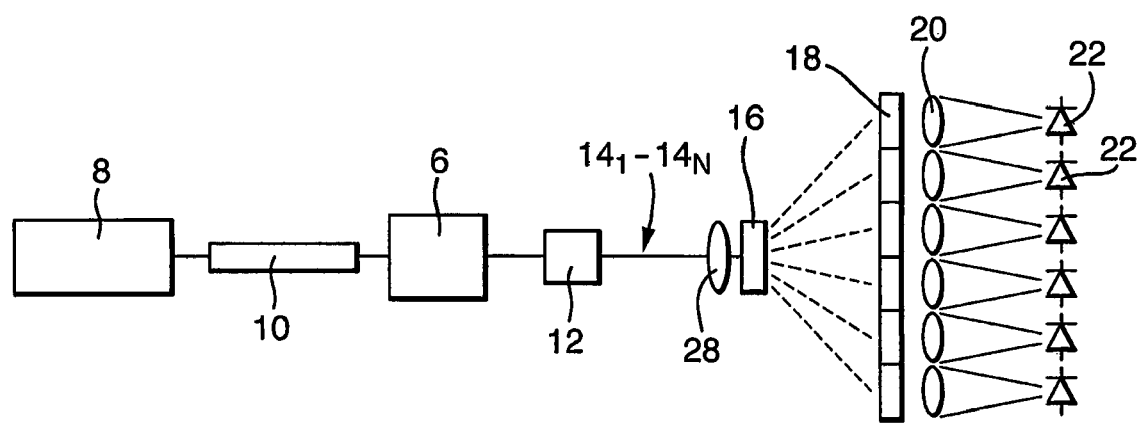
Figure 3:
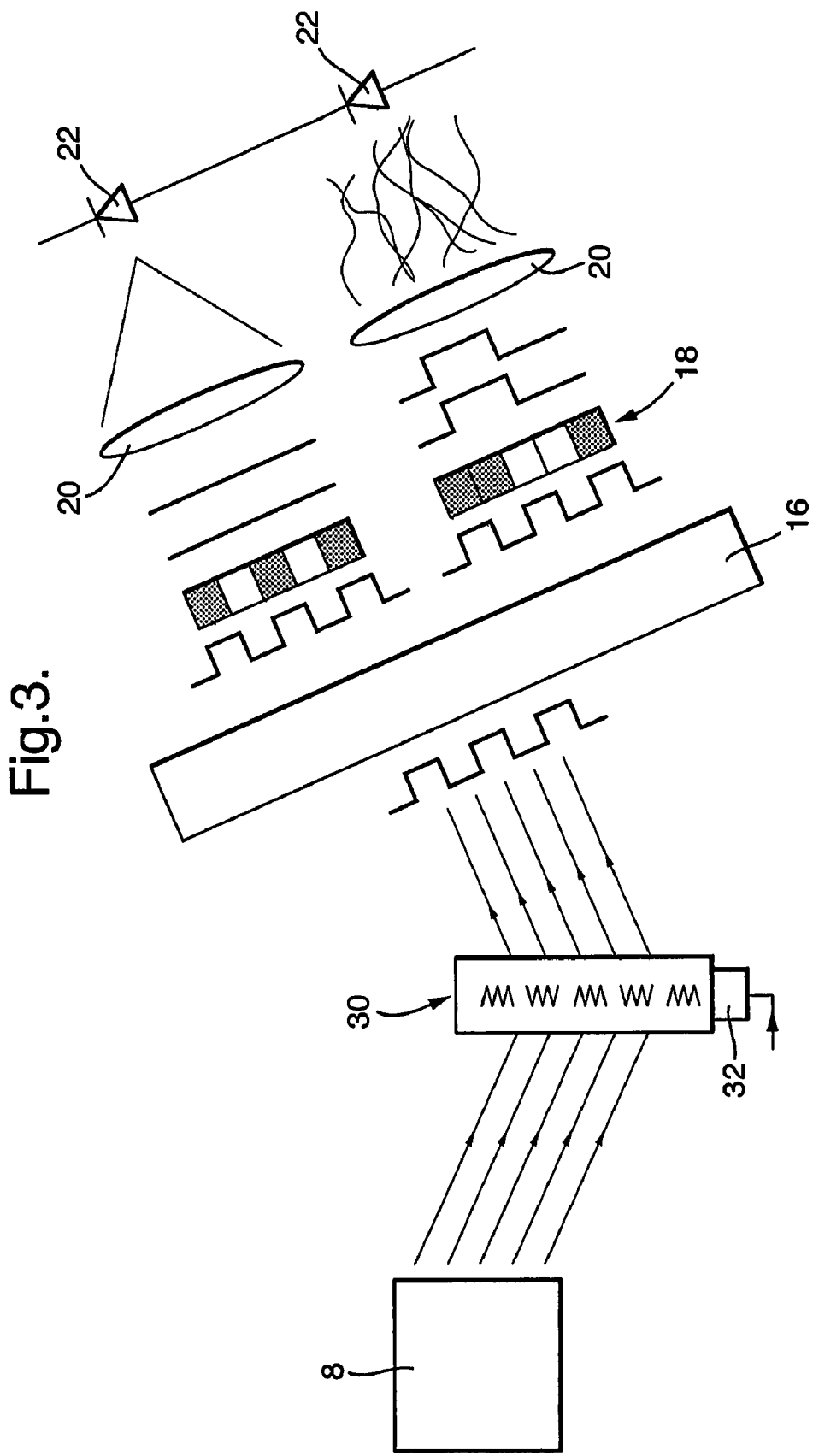
Figure 4:
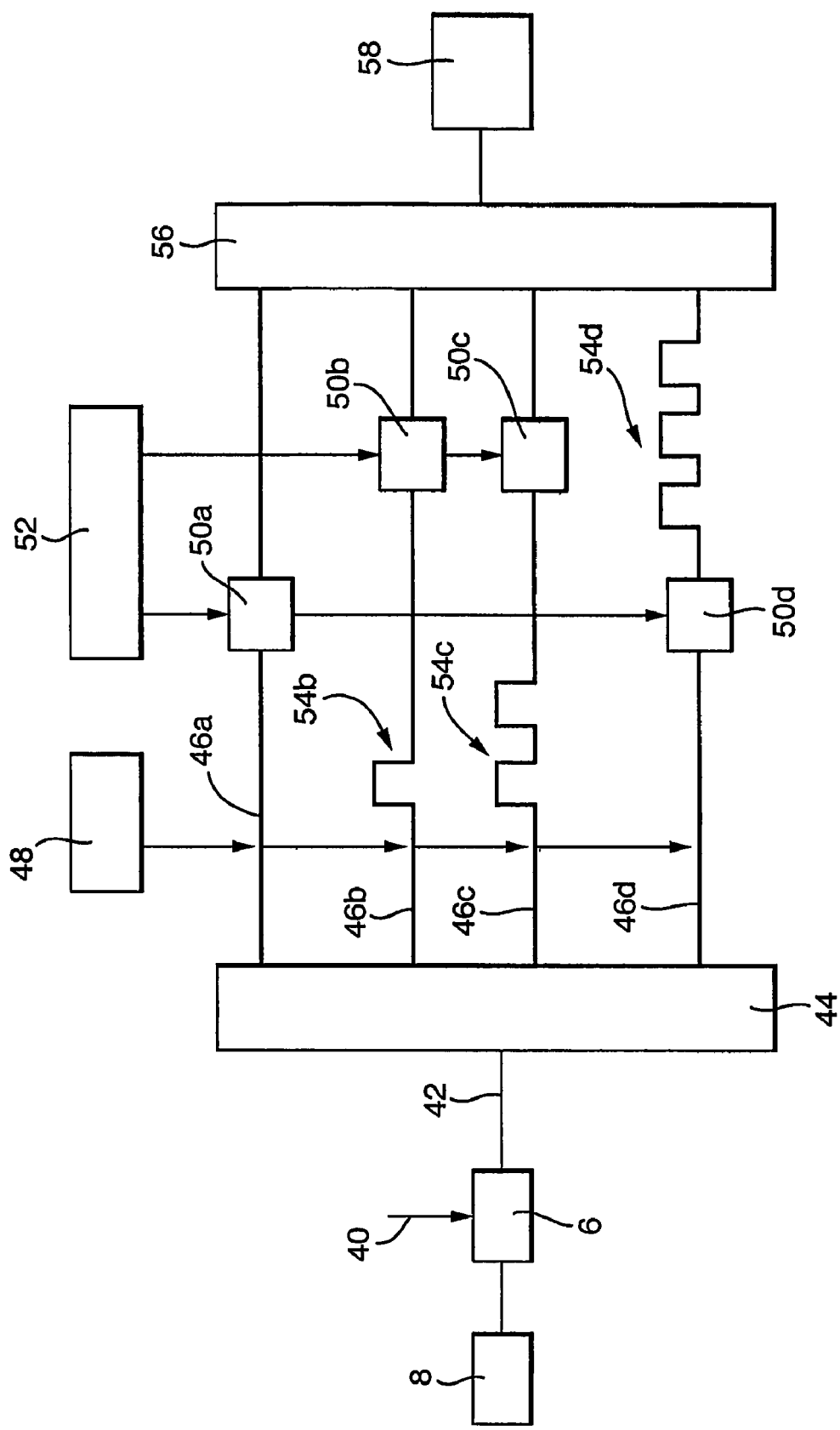

The invention will now be described by way of example only with reference to the following drawings of which;

FIG. 1 shows a schematic of a correlation apparatus according to the present invention, FIG. 2 shows a schematic of the apparatus of FIG. 1 from the side, FIG. 3 shows a schematic of a different embodiment of the invention, and FIG. 4 shows an embodiment of the invention implemented in integrated optics.

FIG. 1 shows a correlation apparatus according to a first aspect of the present invention. An input data stream 2, for instance as received via a fibre optic cable, comprises an optical binary amplitude modulated digital signal, i.e. each bit of data is represented by one of two light intensity levels for a certain duration, the bit period. Such optical digital data transfer is common in telecommunications and data transfer rates of 10 Gigabits per second or 40 Gigabits per second may be used with possibly higher rates being used in the future. Such data transfer rates can be too fast for existing pattern recognition correlators, especially if they are required to recognise many different reference patterns simultaneously.

The input data stream is incident on a very high speed photodetector 4 which is capable at operating at the high data rate. The photodetector 4 detects the intensity level of the incident radiation which is converted to an electrical data signal with the same data rate.

The electrical output of the photodetector 4 is, after appropriate amplification and possibly sharpening, used to control a phase modulator 6. The phase modulator 6 modulates the output of a continuous wave stable laser 8 and imparts a binary phase modulation in response to the input data stream. A diode-pumped YAG laser could be used as the laser and the output is amplified by an erbium doped fibre amplifier 10 prior to phase modulation although amplification after modulation could be performed provided the amplifier maintains the correct phase pattern. The wavelength of operation of the laser must be one where the appropriate phase modulators, SLMs and photodetectors are available at, the necessary speeds. Current telecommunications wavelengths may be useful as fast components are readily available, i.e. wavelengths of 1.55 μm or 1.3 μm may be used, although 1.55 μm is preferred as it is a longer wavelength. As the skilled person will appreciate a longer wavelength can reduce the effect of various changes on the system, effectively increasing the tolerance of the system. Further for a particular laser output power a longer wavelength means that more photons are produced (given the energy of each photon is proportional to the frequency) which results in a greater electrical output at the detector. It may of course be desirable to use longer wavelengths still in some situations provided the suitable components exist although of course the frequency needs to be high enough to allow amplitude modulation at the data rate.

The phase modulated bit stream is then split N ways by a beam splitter 12 and input to N different fibre optic delay lines $14_1$ to $14_N$. Each delay line has a different delay with the delay being increased from one delay line to the next by a time t which is equal to the bit duration of the input data stream. Therefore a first delay line $14_1$ introduces a certain delay T, a second delay line introduces a delay of T+t, a third delay line a delay of T+2t and so on to the Nth delay line which has a delay of T+(N−1)t.

Given that the incremental delay between each delay line is equal to the bit duration of the input data the output of the first delay line will be the first bit, the output of the second delay line will be the previous bit, the output of the third delay line will be the bit preceding that and so on. Therefore the outputs of the delay lines $14_1$ to $14_N$ represent the last N bits of the input data stream.

Obviously matching the relative delay of the delay lines to the bit rate of the incoming data requires the bit rate of the data to be known. In most applications the incoming data bit rate will be known or possibly could be controlled and so the apparatus can be designed accordingly. However in some cases it may not be possible to know the bit rate in advance. In such a case the apparatus could store the incoming data temporarily and then read it out to the phase modulator at the required bit rate, i.e. that which matches the incremental delay on the delay lines.

With reference to FIG. 2 which shows a side on view of the apparatus shown in FIG. 1, the outputs of the delay lines are collimated by a lenslet array 28 then replicated by a Dammann grating replicator 16. As each of the delay lines $14_1$-$14_N$ is a fibre optic the output is effectively a point source. The outputs from all the delay lines are therefore collimated to form a wavefront. This wavefront is then passed to the SLM. The collimation could be applied prior to replication of the wavefront by the Dammann grating as is shown in FIGS. 1 and 2 or in an alternative arrangement the point source outputs of the delays lines could be replicated and then collimated by a lenslet array adjacent the SLM.

The Dammann grating replicator is a diffractive optical arrangement that provides replication and spatial separation of the replicated input optical signals. In effect the data spatial phase pattern output from the delay lines $14_1$ to $14_N$ and collimated by lenslet array 28 is replicated a number of times to produce a plurality of spatially separated data phase patterns.

The replicated data phase wavefronts are then incident on a phase modulating spatial light modulator (SLM) 18 displaying a plurality of reference phase patterns so that each reference phase pattern displayed on the SLM 18 is illuminated with a data phase pattern, i.e. one of the replicated outputs of the optical delay lines. Generally each separately addressable area of the SLM, i.e. each pixel, is used to represent a different bit of the reference phase pattern. Obviously then the replicated data phase patterns should be arranged so that each bit of the data phase pattern illuminates a single pixel of the SLM. In other words the outputs of the delay lines should be arranged so that after collimation and replication the pitch of the collimated beams matches the pitch of the SLM pixels. This may require a degree of magnification or minification. Typical SLMs tend to have a pitch of about 30 μm.

As shown in FIGS. 1 and 2 the output of the delay lines is a linear array of N bits which is then replicated into a series of linear arrays. In which case the reference patterns would be displayed on the SLM 18 as linear arrays. In this case the lenslets 20 may be elongate and anamorphic although there are various options for the complex lenslet array. However other spatial arrangements could be used as convenient. For instance the output of the delay lines could be grouped as a two dimensional array which is then replicated by the Dammann grating and the reference patterns arranged in the same array format. If, for example, such two-dimensional arrays are square or nearly square the lenslet array 20 can comprise simple spherical lenslets with matching apertures.

Note the illustrated SLM is a transmissive SLM but reflective SLMs could be used instead.

If the phase pattern on one area of the SLM 18, i.e. the area corresponding to a particular reference phase pattern, is the conjugate of the incoming replicated data pattern the light emerging from the SLM is a plane wave and is focussed by lenslet array 20 onto point photodetector 22. If there is no close match of the phase pattern with the reference pattern the light wavefront emerging from that part of the SLM is not plane and is not strongly focussed on the point detector 22. The detected intensity is therefore greater in the case of a close match and the intensity of light detected at the point detector can be used to indicate correlation. The individual detectors of the output detector array may be screened to minimise illumination by stray light.

Note that using binary phase modulation actually there will be a spurious match if the phases of all bits of the pattern of light incident on the SLM are inverted relative to the pattern used to generate the reference, i.e. all 0° phases become 180° and vice versa. In some circumstances this may be only a minor inconvenience since a delayed version of this section of the input data can be examined digitally at leisure to verify a match or otherwise. However in other cases it is desirable to eliminate the unwanted match at source, and one such means is described here. To distinguish between the two cases, which have opposite optical phase but the same amplitude and intensity, one or more additional bits with known fixed phase could be added to the patterns with the corresponding bit(s) on the SLM being set to give an output in phase with the required output, but out of phase with the inverted output. Therefore the wavefront from the reference pattern including the additional bit(s) in the inverted case is now no longer planar whereas that for the required pattern is. Therefore the required pattern gives a greater detector output.

Referring back to FIG. 1 the additional bit is added by the additional data line 24.

This additional signal line may have another use as discussed later, as it provides a constant common phase reference to each reference phase pattern.

Each area of reference phase pattern on the SLM 18 therefore has an appropriate lenslet from the lenslet array 20 to focus light from that area to one of the point detectors 22. The shape and configuration of the lenslets of the lenslet array will be determined by the shape and configuration of the reference patterns on the SLM 18. Square array patterns or the like may therefore be preferred as conventional two-dimensional lenslet arrays may then be used. The lenslet array could however be replaced by or complemented by an array of diffractive optical elements to focus the wavefronts and in some cases the SLM could be configured to incorporate a focussing diffractive pattern in combination with the reference data pattern.

It is obviously important to maintain phase stability through the apparatus and hence phase stable components are preferably used. As mentioned the laser is preferably a stable laser but also could be stabilised by any number of known laser stabilisation techniques. The optical delay lines preferably use temperature stable optical fibre to minimise drift of the phase and the whole assembly is likely to be maintained at constant temperature. If the SLM is a binary phase device with no phase adjustment, it is necessary to employ a laser frequency tailored to the optical delay line delays (or vice versa), e.g. so that all delay lines have an integer number of optical wavelengths, because ultimately the required correlation function operates through the optical phase. Various means exist to lock the absolute frequency of a stable laser, e.g. to a fibre optic delay line—for instance the technique described in International Patent Application WO 00/17613 (the contents of which is incorporated by reference hereto) could be used to provide the stable laser required.

Some phase drift is possible however and therefore it may be desirable to employ a fine adjustment system. One preferred way of achieving this is to use an analogue phase SLM as SLM 18 such as a Meadowlark Shapeshifter SLM. The analogue phase SLM can give any phase modulation required and therefore, for example, if the phase of the input signal were to drift at any pixel the two phase modulation states employed by the analogue SLM at that pixel can be adjusted to compensate.

Drift of the system to can be detected through the periodic calibration procedure in which known reference signals are injected as input data. An initial threshold level can be determined by inputting a known reference pattern as input data. This will result in a correlation with the appropriate reference pattern and will give rise to a maximum output at the corresponding point detector 22. This output at a known correlation can be used to establish a threshold level for correlation of that reference pattern. Periodically inputting the known reference pattern can give an indication of drift in the system. If the drift is small there may be no need to modify the apparatus at all or it may be sufficient to adjust the threshold level slightly. However if the threshold levels decrease too much from their peak starting values this indicates unacceptable drift and a serious degradation in performance and correction will be required. To correct for drift an analogue phase SLM is especially useful as it can be used to offset all errors in the system, and permit the use of a laser of arbitrary fixed frequency.

A possible procedure to set up the SLM phase states is as follows. An intensity modulator (not shown) sends a single bit into the system at a low repetition rate. Each detector's output will then be a series of voltage levels over time indicative of the relative phase states of (a) the continuously running additional bit provided by line 24, and (b) the single input bit passing through the delay lines and SLM pixels. By adjusting each SLM pixel to maximise these individual voltages, all pixels, including the "reference" pixel, can be brought to a common phase within each array of reference phase states. From this ideal point the SLM can be set to the desired binary phase states required by the references.

The number of bits in the data spatial phase pattern and correspondingly the reference data phase pattern will depend upon the application for which the correlator is being used. Obviously the more data bits in the pattern the more delay lines are required and the less sensitive the system will be to individual bit errors. Given that the whole of the input data stream is displayed over time however it may be easier to split longer searches by looking for different partial reference patterns. For example suppose the input data corresponded to text from a number of documents and the system wanted to detect instances of the word IDENTIFIED. Two separate reference patterns could be formed—one corresponding to IDENT and the other to IFIED. Any instance of IDENT would then give rise to a correlation as would an instance of IFIED. To reject false positives however the processing would only report a match when an instance of correlation for IDENT was followed a known time later by the correlation of IFIED.

Note that by including some spare pixels on the SLM, the SLM could be updated with new reference patterns as the system is operating so it is not necessary to stop the correlation to add new search terms. Similarly reference patterns no longer needed can be deleted during operation. This could be particularly useful when the correlator is running on a continuous data input feed which can't be paused and adding a new search term should not stop the continuing correlation of reference patterns already displayed on the SLM.

Data patterns of between 40 to 50 bits may be a useful size. Using 50 bits and a phase modulating SLM of 512 by 512 pixels each pixel representing a bit up to 5000 reference patterns could be displayed on the SLM depending on the amount of spacing between separate reference patterns.

This embodiment of the present invention therefore offers a fast and simple pattern recognition correlator capable of working with very high data rates. The correlator can work as fast as the input data arrives. Current data rates tend to be around 2.5 Gigabits per second at the moment but the industry is moving towards 10 Gigabits per second and are possibly looking to move to 40 Gigabits per second or higher. In some respects higher data rates reduce the problem of drift because the delay lines become shorter so that the drift of optical phase, say with temperature, becomes smaller.

The embodiment described above uses fibre optic delay lines of differing lengths but many other components could be used to achieve the incrementally delayed outputs. For instance integrated optics, could be useful, especially at higher bit rates where the difference in optical path length between the different output channels is small, and this medium allows a choice of output spacings to match system requirements, i.e. the pitch of the output may be inherently matched to the pitch of the pixels on the SLM. Integrated optics delay lines could be formed in materials such as glass, Lithium Niobate or Gallium Arsenide although Gallium Arsenide has advantages in terms of flexibility in creating meandering delay lines. When using materials such as Lithium Niobate or Gallium Arsenide it is also possible to provide electrodes on the substrate and by applying voltages change the refractive index of the waveguide. This is the basis of some commercial phase modulators and could allow for fine control of the phase of the signal passing through individual delay lines. Bulk optical systems using for instance multiple reflections, eg within a glass plate, could also be used as the optical delay. An embodiment of the invention implemented in integrated optics is described in more detail below with respect to FIG. 4.

The present invention has application to any area of pattern recognition and the input data stream could be output from a database or could be a live feed from a data capture device. This embodiment of the present invention has particular application however in situations where a high input data rate is used and/or there is a large amount of data to search. One area is high speed large-database searching, for example internet searching or identifying barcodes etc, wherein data can be communicated down a high speed data link to a correlation apparatus of the present invention.

Another area where huge amounts of data need to be searched is genetic databases where it may be wished to search a very large gene sequence for a particular sequence or sequences of bases.

The invention could also be used to check for non-instances of correlation. For instance a random code generator wanting to generate a unique code, for instance in the financial sector, may wish to check that the code it indeed unique and so would search a database of all issued codes to see if it had previously been issued.

FIG. 3 shows a second embodiment of the present invention where similar components as shown in FIG. 1 bear the same reference numerals. Here the optical delay means of FIG. 1 is replaced with an acousto-optic cell 30. In this embodiment the laser 8 first illuminates the acousto-optic cell 30 bearing the data phase patterns with unmodulated light. Hence the cell 30 imparts a phase modulation to the wavefronts which are then replicated by replicator 16 before the replicated waveforms are incident on the SLM 18.

The cell 30 comprises an acoustic medium which changes optical properties in response to acoustic excitation. A transducer 32, responsive to the input data, transmits appropriate acoustic signals to the medium so as to produce a phase modulation. As the input data changes with time so the transducer changes the modulation and so an acoustic waveform is transmitted to the medium which propagates across the cell before being absorbed by an absorber. As the acoustic signals propagate across the medium the cell displays a spatial data phase pattern (varying refractive index) which modulates the incident radiation. As described above when the pattern displayed on the acousto-optic cell is the conjugate to that displayed on the SLM the resulting wavefront is plane and is focused by lenses 20 onto detectors 22.

The second embodiment of the invention therefore also offers a simple means of performing pattern recognition but limitations in addressing the AO cell mean it is not able to cope with as high data rates as the embodiment described above.

As mentioned above there are advantages to implementing the invention in an integrated optics environment, i.e. waveguides formed integrally in a substrate together with electro-optic devices. FIG. 4 shows an embodiment of the invention implemented in integrated optics.

An amplitude modulated laser 8 is phase modulated with binary phase by fast phase modulator 6 based on the incoming data signal 40. The incoming data 40 is a digital electric signal but may have been converted from an amplitude modulated optical signal as described with reference to FIG. 1. The output from fast phase modulator 6 is a temporal binary phase modulated optical signal.

This is passed via an input waveguide 42 to a 1–N MMI splitter 44. MMI splitter 44 is a multimode interference device which has an input waveguide 42, a multimode waveguide region and N output waveguides 46a ... d (four are shown for ease of reference but in a working device the number of output channels may be much higher). The input optical signal excites multiple modes in the MMI device which is dimensioned such that replicas of the input are re-imaged at each of the output waveguides 46a ... d. MMI splitters of this nature are well know in the art, see for example U.S. Pat. No. 5,410,625 which describes how such MMI devices can be used to function as beamsplitters and recombiners. The contents of U.S. Pat. No. 5,410,625 are hereby incorporated by reference thereto, in particular the discussion from column 5, line 64 to column 6, line 54 and from column 17, line 66 to column 19, line 19. International patent publication WO03/065088 also describes suitable MMI splitters and recombiners.

Waveguides 46a ... d are formed from any convenient material, for instance gallium arsenide, or may be free space waveguides formed in a semiconductor material such as silicon.

Amplitude modulation control 48 is provided for intensity matching to ensure optimal performance.

Each of the waveguides has a different length so as to give a different, incremental delay length in a manner similar to the different lengths of optical fibre as described above with the increment in delay from one waveguide to the next being equal to the bit time of the incoming data. The skilled person will be well aware of how to construct waveguides of different length, for instance by incorporating additional turns 54b ... d. The waveguides therefore convert the temporal input signal to a parallel optical data signal at the output.

However each waveguide 46a ... d has an associated phase modulator 50a ... d controlled by phase modulator control 52. The phase modulator control controls the binary phase modulation applied to each waveguide and applies an appropriate phase modulation for a particular reference data string.

As for the embodiments noted above in general the phase modulation applied should be the inverse of the phase modulation for the desired data.

The reference phase modulation may be applied at any point in the delay line. As illustrated in FIG. 4 the phase modulators need not be aligned and the delay to a particular waveguide may be applied before or after the phase modulator or both. This is because the reference data is not updated at the input data rate and so the reference data, and hence appropriate phase modulation applied to each channel, is effectively constant during the delay time. Were however the reference phase modulation to be updated more rapidly it may be advantageous to ensure that the phase modulators are located at the end of the delay line to ensure that the correct phase modulation is applied to the correct input data.

Each waveguide having its own phase modulator means that there is no need to align the output of the optical delay means with an SLM as described above. Further any fine control to an individual channel is easy to achieve.

The phase modulators are integrated electro-optic modulators such the skilled person would be well familiar with.

The outputs of waveguides 46a . . . d form the inputs to an MMI N-1 combiner 56. The MMI combiner couples the outputs of waveguides to a single output from the combiner which feeds to photodetector 58. Where all the inputs to the MMI combiner are in phase the signals constructively add whereas a phase mismatch with cause destructive coupling The intensity on the detector can therefore be used as an indication of correlation as described above.

Note that a series of optical splitters and recombiners could be used to create the optical channels. For instance the phase modulated temporal signal could pass to a first 1 to 6 MMI splitter say. Each of the six output waveguides may then be input to a further 1 to 6 way splitter each with an associated set of six waveguides. This results in thirty six different optical channels. The different delays could be built into part of the common waveguides as well. For instance the first six waveguides leading from the first splitter to the second splitter could be incrementally delayed with respect to each other by delays of 0, 6t, 12t, 18t, 24t and 30t. Each of the six sets of secondary waveguides could then have incremental delays of 0, t, 2t, 3t, 4t and 5t. Therefore the signal passed down waveguide in the first set with an incremental delay of 0 is split into six secondary waveguides with incremental delays of 0, t, 2t, 3t, 4t and 5t respectively. The signal split into the waveguide in the first set with a delay of 6t is then split into the six secondary waveguides to give six signals with final delays of 6t, 7t, 8t, 9t, 10t and 11t. In this way then each of the thirty six channels has a different delay length and yet part of the waveguide is common to other optical channels. This can reduce the number of channels needed and allow multiple splitters to be used. Obviously when the optical channels branch out in this fashion the reference phase modulation needs to be applied to each separate waveguide section and not any common waveguide.

In combining the signal a similar approach could be used or a single larger combiner could be used.

The invention claimed is:

1. A correlation apparatus comprising an optical delay means for converting a temporal data input stream to at least one parallel optical data stream having a phase modulation replicating the input data and a reference phase modulator for applying a parallel phase modulation replicating at least one reference data set wherein the reference phase modulator and optical delay means are aligned so as to create a parallel optical signal which has been modulated in phase according to both input and reference data, wherein the optical delay means comprises a plurality of optical waveguide delay lines of different delay.

2. A correlation apparatus as claimed in claim 1 wherein the optical delay means provides a plurality of channels each producing a replica of an input phase modulated optical signal and each having a different delay wherein the applied delay in successively delayed channels varies by a constant amount.

3. A correlation apparatus as claimed in claim 2 wherein the input phase modulated optical signal is a digital phase modulated signal and wherein the incremental delay between successive delays is equal to the bit rate of the input phase modulated optical signal.

4. A correlation apparatus as claimed in claim 3 wherein the input phase modulated signal is a binary phase modulated signal.

5. A correlation apparatus as claimed in claim 2, wherein the reference phase modulator comprises a plurality of phase modulating elements, at least one phase modulating element for each optical channel.

6. A correlation apparatus as claimed in claim 5 wherein the phase modulating elements are integrated electro-optic phase modulators.

7. A correlation apparatus as claimed in claim 1 wherein the optical waveguide delay lines are optical fibres.

8. A correlation apparatus as claimed in claim 1 wherein the optical waveguides are integrated optics waveguides.

9. A correlation apparatus as claimed in claim 8 wherein the integrated optics waveguides are hollow core waveguides.

10. A correlation apparatus as claimed in claim 1 wherein the optical delay means comprises a phase modulated optical source modulated in response to an input temporal data stream.

11. A correlation apparatus as claimed in claim 10 wherein the phase modulated optical source comprises a laser.

12. A correlation apparatus as claimed in claim 11 wherein the phase modulated optical source comprises an externally modulated laser.

13. A correlation apparatus as claimed in claim 1 wherein the reference phase modulator comprises a phase modulating spatial light modulator (SLM).

14. A correlation apparatus as claimed in preceding claim 13 the phase modulating SLM is a binary phase modulating SLM.

15. A correlation apparatus as claimed in claim 13 wherein the phase modulating SLM is a analogue phase modulating SLM.

16. A correlation apparatus as claimed in claim 15 wherein the phase modulating SLM applies a binary phase modulation.

17. A correlation apparatus as claimed in claim 1 further comprising a combining means for causing interferometric coupling of the parallel optical signal and a photodetector for detecting the output of the combining means.

18. A correlation apparatus as claimed in claim 17 wherein the combining means is a multi-mode interference combiner.

19. A correlation apparatus as claimed in claim 17 wherein the combining means comprises a focussing means having a separate focussing element in optical alignment with the parallel optical signal and the photodetector is a point photodetector located at the focal point of the or each focussing element.

20. A correlation apparatus as claimed in claim 19 wherein the focussing element comprises a refractive lens of an appropriate design and shape to focus the parallel optical signal.

21. A correlation apparatus as claimed in claim 1 wherein the optical delay means generates a plurality of identical parallel optic data streams and a plurality of reference data phase modulators, each reference data phase modulator applying a reference phase modulation to one of the parallel optical data streams.

22. A correlation apparatus as claimed in claim 21 comprising a spatial optical phase modulator displaying a plurality of reference spatial phase patterns, each reference spatial phase pattern being a reference data phase modulator.

23. A correlation apparatus as claimed in claim 21 wherein the apparatus comprises an optical replicating means arranged to act on the output of the channels of the optical delay means to provide the plurality of parallel optical data streams.

24. A correlation apparatus as claimed in claim 23 wherein the optical replicating means comprises a diffractive optical element.

25. A correlation apparatus as claimed in claim 1 comprising a calibration means for periodically calibrating the apparatus.

26. A correlation apparatus as claimed in claim 25 wherein the calibration means comprises a means for inputting data known to correlate with a reference data set and measuring the output of the apparatus.

27. A correlation apparatus as claimed in claim 26 wherein the calibration means monitors the output of the photodetector when the data is input and sets a threshold for identifying a correlation based on this output.

28. A correlation apparatus as claimed in claim 25 wherein the calibration means adjusts the phase modulation of at least part of the analogue SLM in response to phase drift of the apparatus.

29. A correlation apparatus as claimed in claim 1 wherein the reference phase modulator comprises a spatial optical phase modulator for displaying a plurality of reference spatial phase patterns and the optical delay means comprises an optical replication means for generating a plurality of identical data spatial phase patterns, each data spatial phase pattern being in optical alignment with a different reference spatial phase pattern.

30. A correlation apparatus comprising an optical delay means for converting a temporal data input stream to at least one parallel optical data stream having a phase modulation replicating the input data and a reference phase modulator for applying a parallel phase modulation replicating at least one reference data set wherein the reference phase modulator and optical delay means are aligned so as to create a parallel optical signal which has been modulated in phase according to both input and reference data, wherein the optical delay means comprises an acousto-optic cell with at least one channel.

31. A correlation apparatus as claimed in claim 30 wherein the acoustic cell comprises an acoustic medium, a transducer for transmitting an acoustic wave to the acoustic medium based on a input data stream.

32. A method of correlating input data with reference data comprising the steps of;
taking a temporal phase modulated optical signal wherein the phase modulation represents the input data,
converting the temporal phase modulated optical signal into at least one parallel data optical signal having a phase modulation which represents the input data,
modulating said at least one parallel optical data signal with a phase modulation replicating a reference data,
interferometrically coupling the or each optical data signal modified by a reference modulation and directing onto a detector,
and using the detector output as an indication of correlation between the input data and the reference data, wherein the method further comprises:
an initial calibration step of performing a correlation with input data known to correlate with the reference data and measuring the output of the associated detector and using the output to set a threshold level, the steps of periodically repeating the calibration step, wherein the output of the detector during the calibration step is used to maintain the current threshold level, adjust the threshold level or indicate a need to re-set the phase states of the system, and wherein the step of modulating the parallel optical data with a phase modulation representing reference data is performed using an analogue spatial light modulator (SLM) and periodically the phase of at least part of the appropriate reference spatial phase pattern displayed on the SLM is adjusted to compensate for a phase drift in the radiation incident on the SLM at that point.

33. A method as claimed in claim 32 wherein the step of converting the temporal phase modulated optical signal into at least one parallel data optical signal phase modulation which represent the input data comprises the step of inputting the temporal phase modulated optical signal into an optical delay means having a plurality of channels each producing a replica of the input phase modulated optical signal and each having a different delay wherein the applied delay in successively delayed channels varies by a constant amount.

34. A method as claimed in claim 33 wherein the temporal phase modulated optical signal is a binary digital phase signal having a bit rate equal to the amount by which the delay in successive channels of the optical delay means varies.

* * * * *